United States Patent

[11] 3,599,920

| [72] | Inventor | Otto Hoegerl<br>Saegertown, Pa. |
|---|---|---|
| [21] | Appl. No. | 850,825 |
| [22] | Filed | Aug. 18, 1969 |
| [45] | Patented | Aug. 17, 1971 |
| [73] | Assignee | National Tel-Tronics Corp.<br>Yonkers, N.Y. |

[54] ELECTRIC TERMINAL BOARD MOUNTING STRUCTURE
1 Claim, 7 Drawing Figs.

[52] U.S. Cl........................................ 248/300,
339/17
[51] Int. Cl........................................ H05k 1/02,
H05k 7/08
[50] Field of Search.......................... 248/27,
224, 300, 301, 475; 339/17, 17 C, 17 L, 17 LC

[56] References Cited
UNITED STATES PATENTS
| 2,909,710 | 10/1959 | Platt | 317/17 (R) X |
| 2,702,841 | 2/1955 | Bernstein | 248/300 UX |
| 2,753,141 | 7/1956 | Weber | 248/300 X |
| 2,855,171 | 10/1958 | Gardner | 248/300 X |
| 3,209,308 | 9/1965 | Aquillon | 248/300 UX |

FOREIGN PATENTS
| 651,842 | 11/1962 | Canada | 248/O,B, |

*Primary Examiner*—William H. Schultz
*Attorney*—Charles E. Temko

ABSTRACT: A clip-type mounting bracket structure for supporting a planar electric terminal board at an angle with respect to a supporting chassis. The structure includes a first member having a plurality of bendable tabs adapted to penetrate corresponding openings in the terminal board, and a second member disposed at an angle with respect to the first member engageable with said chassis. In an alternate form of the embodiment, wire-lug-engaging means is formed integrally with the first member.

PATENTED AUG 17 1971  3,599,920
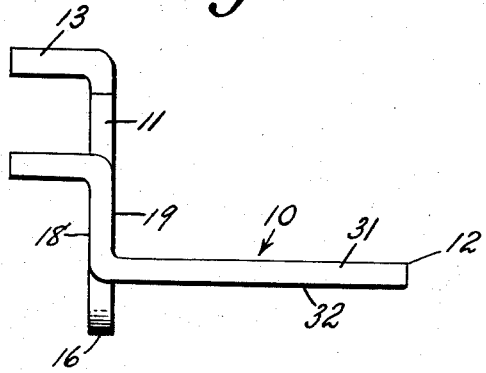
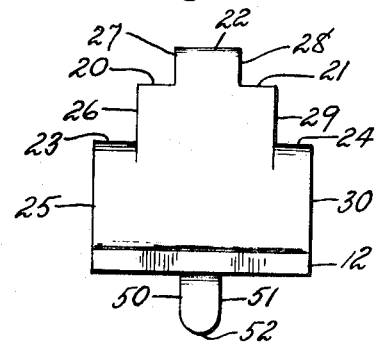
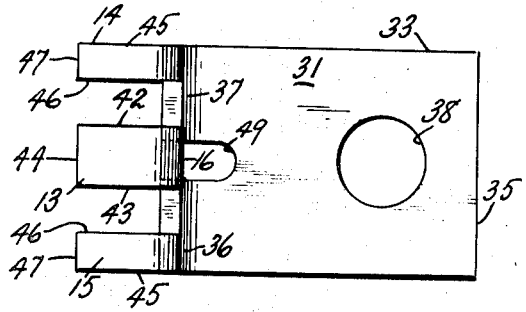
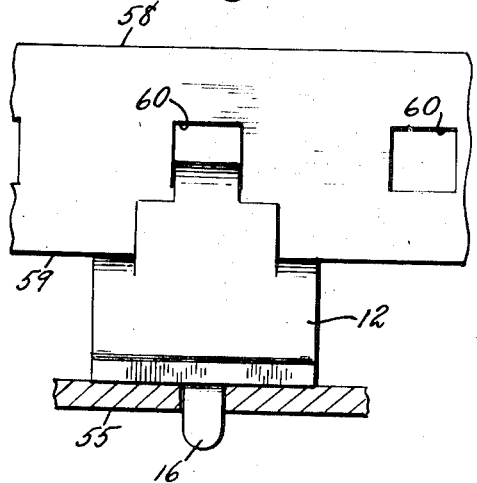
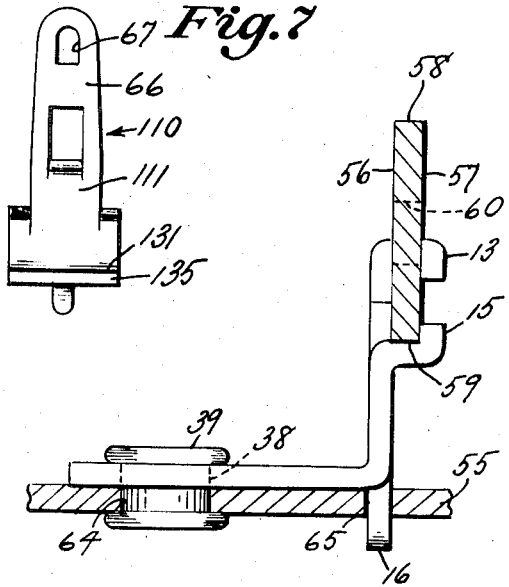
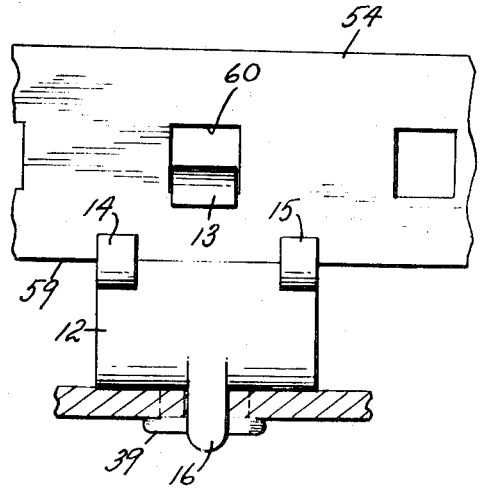

ELECTRIC TERMINAL BOARD MOUNTING STRUCTURE

This invention relates generally to the field of electrical and electronic components, and more particularly to an improved means for mounting a planar terminal board upon a chassis. Devices of this general type are well known in the art, and the invention lies in the specific constructional details which permit economies in production and improved rigidity of interconnection.

It is among the principal objects of the present invention to provide a self-contained bracket structure which requires no rivet or eyelet or other type of compression fastener to secure it to the terminal board.

Another object of the invention lies in the provision of improved clip type bracket structure which will eliminate the possibility of loose fastening to the terminal board or other panel, by virtue of the fact that it is not dependent upon an eyelet, rivet or other circular fastener, whereby relative rotation between the bracket and the panel is prevented.

Yet another object of the invention lies in the provision of an improved bracket structure of the class described, in which the cost of utilization may be markedly reduced, by virtue of the fact that the eyelet or rivet conventionally employed is not required. A feature of the disclosed embodiments lies in the fact that they may be formed entirely from a single metallic stamping.

These objects and feature, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIG. 1 is a side elevational view of an embodiment of the invention.

FIG. 2 is an end elevational view thereof, as seen from the right of FIG. 1.

FIG. 3 is a top plan view thereof.

FIG. 4 is a side elevational view thereof showing the same in installed condition between a terminal board or panel and an electronic chassis.

FIG. 5 is a fragmentary end elevational view as seen from the left of FIG. 4.

FIG. 6 is a fragmentary end elevational view as seen from the right of FIG. 4.

FIG. 7 is an end elevational view corresponding to that seen in FIG. 2, but showing an alternate form of the embodiment.

In accordance with the invention, the device, generally indicated by reference character 10, comprises broadly a first planar member 11, a second planar member 12, a first centrally disposed tab 13, second and third locking tabs 14 and 15, respectively, and a locating tab 16.

The first member 11 is bounded by an outer surface 18, an inner surface 19, upper edges 20 and 21, an upper bend portion 22, side bend portions 23 and 24, as well as vertical edges 25, 26, 27, 28, 29 and 30.

The second member 12 is disposed at substantially a right angle with respect to the first member 11, and is bounded by an upper surface 31, a lower surface 32, side edges 33 and 34, an end edge 35, and bend portions 36 and 37. A mounting hole 38 allows passage of a rivet 39 (FIG. 4) or similar attaching means.

The first tab 13 extends laterally from the plane of the first member 11, and is bounded by side edges 42 and 43 as well as an end edge 44. The width of the tab 13 is somewhat greater than that of the second and third tabs 14 and 15, each of which is bounded by an outer side edge 45, an inner side edge 46 and an end edge 47.

The locating tab 16 may be formed from material cut from an opening 49 in the second member 12, and is bounded by side edges 50 and 51 and a rounded end edge 52.

Referring to FIG. 4, 5 and 6, a terminal board or panel 54 is supported by the device 10 in angular relation with respect to a punched chassis 55, the terminal board being of conventional design, bounded by first and second planar surfaces 56 and 57, respectively, an upper edge 58 and a lower edge 59. A plurality of substantially equally spaced openings 60 provide for the mounting of solder lug terminals (not shown). During assembly, the first tab 13 is pushed through one of the openings 60 and bent downwardly in a direction toward the second and third tabs 14 and 15. This engagement will position the tabs 14 and 15 to contact the lower edge 59, and when the free ends of the tabs 14 and 15 are bent upwardly in a direction toward the first tab 13, a three-point locking effect is obtained which not only tightly grips the board 54, but effectively prevents rotation of the board with respect to the device.

The mounting of the unitized board and device upon the chassis 55 is accomplished by aligning the hole 38 with a corresponding opening 64, and projecting the locating tab 16 through an adjacent opening 65, following which the rivet 39 passes through the hole 38 and the chassis to be secured. During this interconnection, although a circular fastener is employed, rotation is prevented by the engagement of the locating tab, so that a secure interconnection resembling that existing between the device and the terminal board is obtained.

Turning now to the alternate form of the embodiment illustrated in FIG. 7, parts corresponding to those of the principal form have been designated by similar reference characters, thus avoiding needless repetition.

The alternate form of the embodiment differs from the principal form in that the first tab member 111 is modified to include a wire-engaging lug 66 having an opening 67, through which a conductor (not shown) may be passed and soldered, the lug being suitable for providing a grounding connection to the chassis.

I wish it to be understood that I do not consider the invention limited to the precise details of structure shown and set forth in this specification, for obvious modifications will occur to those skilled in the art to which the invention pertains.

I claim:

1. In combination, terminal board and mounting bracket construction for interconnecting said board to an electronic chassis in substantially right-angle relation thereto, comprising: a single metallic stamping including a first planar member, a second planar member interconnected to said first planar member at substantially a right angle, a first bendable tab lying in a plane extending laterally from the plane of said first member, and spaced from said second planar member a first given distance, said first tab being generally medially disposed with respect to said first and second members, and second and third bendable tabs extending laterally from said first member and spaced from said second member a second given distance substantially less than said first given distance on the same side of the plane of said second planar member, a fourth tab disposed in coplanar relation with respect to said first planar member, and extending through the plane of said second planar member, said second planar member having a mounting opening extending therethrough in spaced relation to said fourth tab, said terminal board having a rectalinear edge, said first tab engaging a perforation in said board, and said second and third tabs engaging said edge, and cooperating with said first tab so support said board in clamping relation with the edge of said board spaced substantially said second distance from second planar member.